March 4, 1952  H. BACHLI ET AL  2,588,072
FLUSH TANK VALVE OPERATING MECHANISM
Filed April 22, 1949
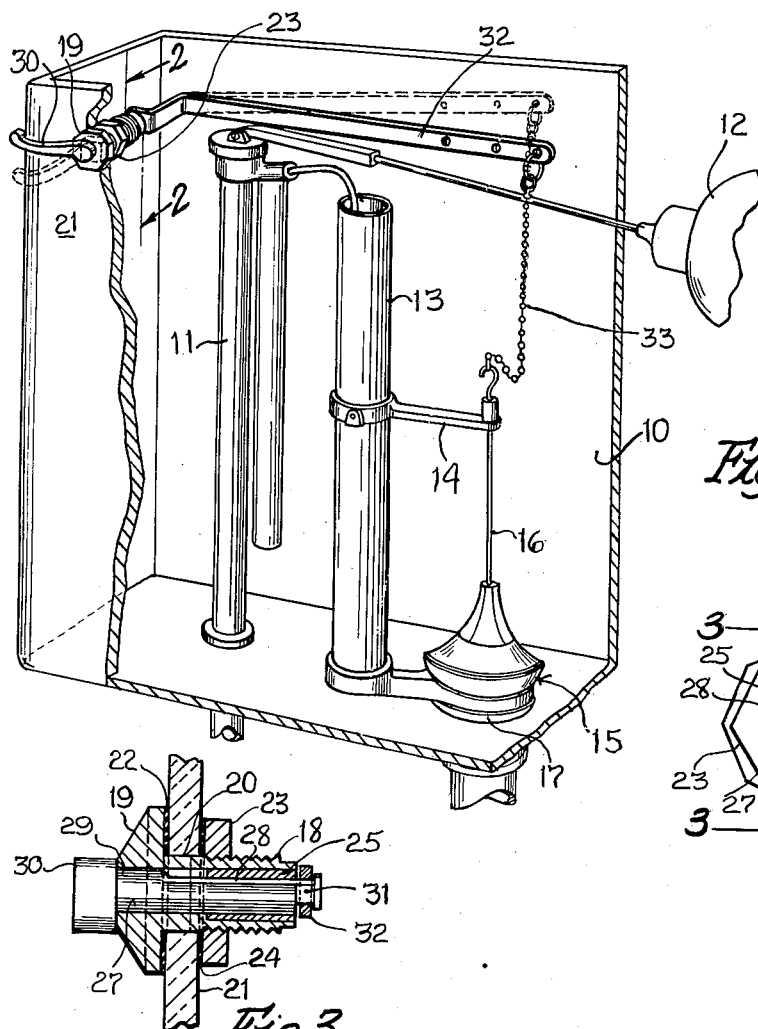
Fig.1.
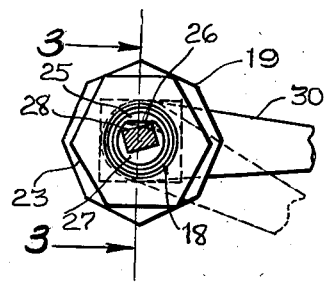
Fig.2.
Fig.3.
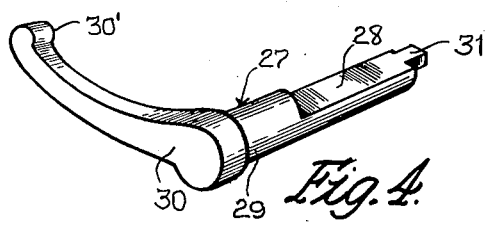
Fig.4.
INVENTORS.
Herman Bachli and
Harry S. Shapiro
BY Clarence E. Thurdy
Their Attorney.

Patented Mar. 4, 1952

2,588,072

UNITED STATES PATENT OFFICE 2,588,072

FLUSH TANK VALVE OPERATING MECHANISM

Herman Bachli and Harry S. Shapiro, Chicago, Ill., assignors to Chicago Specialty Mfg. Co. Inc., Chicago, Ill., a corporation of Illinois Application April 22, 1949, Serial No. 89,085

1 Claim. (Cl. 4—67)

Another and equally important object of the invention is to provide a valve mechanism of the character herein set forth wherein provision is made for limiting the pivotal movement of the lifting rod of the mechanism thereby preventing such rod from striking the cover plate of the flush tank with which the mechanism is associated.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is a fragmentary part-sectional perspective view of a flush tank, showing our improved and simplifier mechanism associated therewith;

Fig. 2 is a sectional detail view taken substantially on line 2—2 of Fig. 1;

Fig. 3 is a sectional detail view taken substantially on line 3—3 of Fig. 2; and Fig. 4 is a perspective view of an operating shaft embodied in our invention.

Referring more particularly to the drawings the embodiment of the invention illustrated is shown associated with a conventional and well known flush tank 10. Such flush tank includes a valve structure 11 controlled by a float 12 and having an overflow duct 13.

Extending from the duct 13 is an arm 14 slidably supporting the outlet valve 15 which includes the stem 16.

Our invention has to do with the moving of the valve 15 from its seat 17 for flushing purposes. In this connection we provide a bushing having a thread-bearing shank 18 extending from a head 19 and projected through an opening 20 formed in the wall 21 of the tank 10. In such position of the shank 18, the head 19 is disposed against a rubber washer 22 bearing against the wall 21. Such head cooperates with a nut 23 threaded upon the shank 18 and bearing against a rubber washer 24 for fixedly securing the bushing to the wall 21.

Driven into the inner end of the shank 18 is a sleeve 25 the circular opening of which is interrupted on one longitudinal side to provide a flat stopping wall 26.

A stud shaft 27 is rotatably mounted in the bushing through the sleeve 25. This stud shaft has a flattened surface 28 which is disposed opposite the flat wall 26.

The diameter of the stud shaft which bisects the flat surface is less than that which bisects the flat wall so that there will be present a small space between the flat surface and the flat wall to permit a limited rotation of the stud shaft 27 relative to the sleeve, a corner of the flat surface 28 striking the flat wall 26, thus limiting such rotation of the stud shaft relative to the sleeve.

Formed integrally on one end 29 of the shaft 27 is a handle 30. This handle 20 has its end portion 30' curved downwardly to provide a finger stop serving to restrain the finger of the hand from sliding off the handle 30 in the upward pivotal movement of the stud shaft 27.

The opposite end portion 31 of this shaft 27 is squared to receive a lift lever 32 fixed to the squared end portion 31 by swaging the said end portion thereon. To the outer end of this lever is connected the stem 16 by flexible chain 33.

From the foregoing, it is apparent that our improved flush tank valve operating mechanism is relatively simple, easy in operation and comprises relatively few parts for accomplishing the object of limiting the pivotal movement of the lift lever 32. By rotatably adjusting the bushing within the opening 20 in which its shank is mounted, the limit of the upward pivotal movement of the outer end of the lift lever may be varied to avoid striking the cover plate (not shown) of the tank 10.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

For a combination comprising a bushing having a shank, a sleeve having driven fit within the shank and provided with a bore one long side of which provides a flat wall, a stud shaft rotatably mounted in the bushing through the sleeve and provided with a flat surface spaced from the flat wall but adapted to engage said flat wall by a corner of such surface to limit the rotation of said shank, a handle on said shank for rotating the same and said shank having a squared end portion opposite the handle, and a lifting lever having one end portion fixed to said squared end portion.

HERMAN BACHLI.
HARRY S. SHAPIRO.

REFERENCES CITED

The following references are of record in the file of this patent:

UNITED STATES PATENTS

| Number | Name | Date |
|---|---|---|
| 1,087,542 | Meaker | Feb. 17, 1914 |
| 1,110,251 | Bragger | Sept. 8, 1914 |
| 1,612,953 | Theleen | Jan. 4, 1927 |
| 2,257,292 | DeGarmo | Sept. 30, 1941 |
| 2,295,686 | Pleasant et al. | Sept. 15, 1942 |